UNITED STATES PATENT OFFICE.

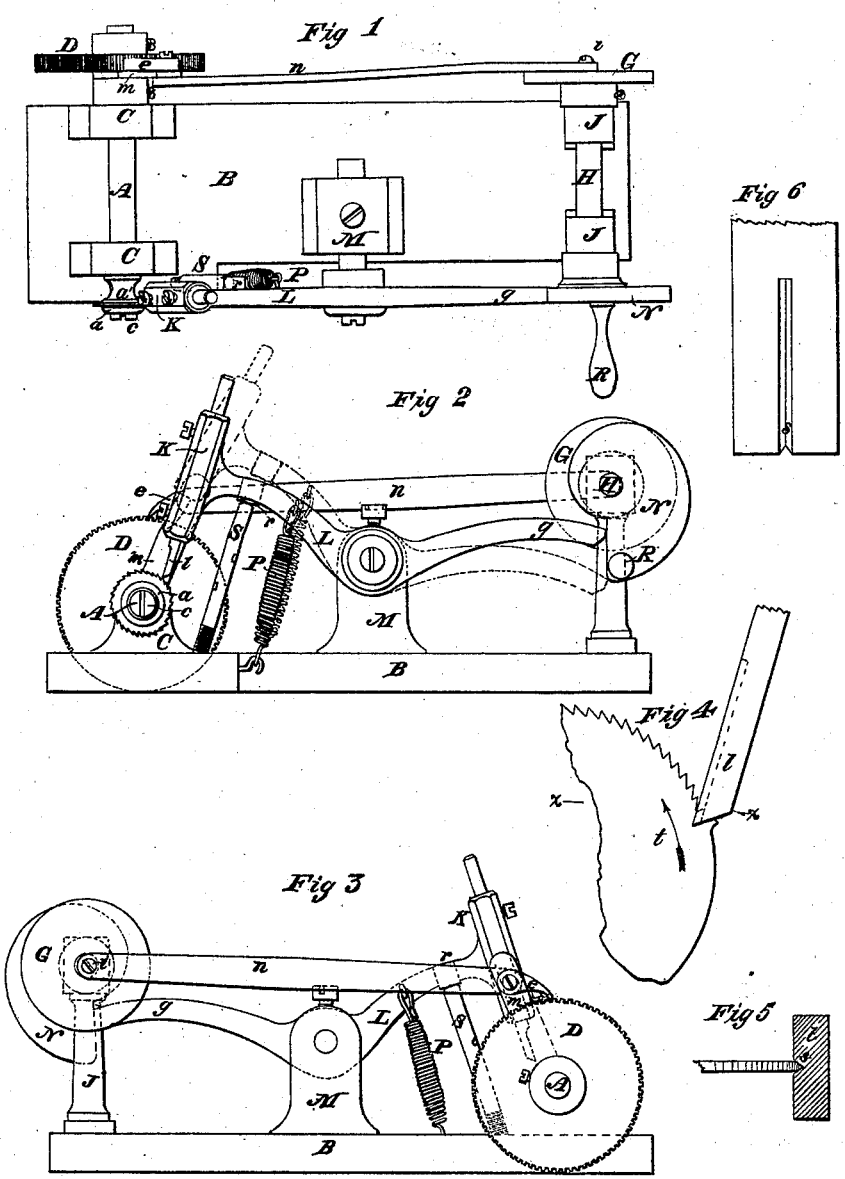

CHARLES KAISER, OF NEW YORK, N. Y.

ENGINE FOR CUTTING SAW-TEETH.

Specification of Letters Patent No. 33,041, dated August 13, 1861.

*To all whom it may concern:*

Be it known that I, CHARLES KAISER, of the city, county, and State of New York, have invented a new and useful Engine for Cutting Saw-Teeth; and that the following is a full, clear, and exact description of the same, reference being had to the accompanying drawing, in which—

Figure 1 represents a plan of a saw cutting engine constructed upon the principle of my invention, Fig. 2 represents a side elevation of the same, Fig. 3 represents an elevation of the hinder side of the same, Fig. 4 represents a side view of portions of a saw plate and the tool of four times the dimensions of the actual saw plate and tool, Fig. 5 represents a section of the same at the line $x\ x$ of Fig. 4, and Fig. 6 represents a face view of the tool of four times the dimensions used.

My invention has reference particularly to the manufacture of the small circular saws used in cutting the grooves of sewing machine needles.

The object of the first part of my invention is to cut the teeth rapidly and equally; and it consists in a combination of the following members, viz., a mandrel to hold the saw plate, mechanism to turn the same intermittently to space the teeth, a chisel to cut the teeth, and mechanism to operate and control said chisel, the whole operating in such manner that the cutting of the teeth to the required depth and the equable spacing of them is effected automatically.

The object of the second part of my invention is to remove the bur caused by the operation of cutting, and it consists in combining the above enumerated members together in such manner that the operation of cutting one tooth removes the bur produced in cutting the preceding tooth.

The object of the third part of my invention is to form the teeth of the proper cross section, to enable them to cut V-shaped grooves in the needles, by means of the same tool which cuts the teeth; and it consists in constructing the tool with a V groove in its face, and combining it with mechanism that causes it to strike the saw blank at the proper angle.

The saw cutting engine represented in the accompanying drawings embodies all parts of my invention. In it the mandrel A to sustain the saw plate during the operation of cutting is sustained at a short distance above the bed, B, of the engine by means of a pair of standards, C C, which form boxes in which it can turn. One end of this mandrel is fitted with a pair of clamp plates, $a\ a'$, between which the saw plate is firmly gripped. The inner of these clamp plates ($a'$) is fast to the mandrel, the outer one ($a$) is movable upon the mandrel and is secured in place by a screw, $c$, by which it may be forced toward the fixed clamp ($a'$) to secure the saw plate between the two. The end of the mandrel that projects beyond the fixed clamp plate is of the same diameter as the eye of the saw plate, so as to center the latter when it is between the clamp plates.

In order to turn the mandrel intermittently, that end of it which is farthest from the clamp plates has a wheel, D, secured to it, whose rim is cut into as many notches as there are to be teeth in the circular saw. A pawl $e$ is fitted to engage in these notches, for the purpose of pushing the wheel around notch by notch, and of holding it in its position during the blow of the cutting tool. To this end the pawl ($e$) is hinged to the outer end of a radius link, $m$, which is pivoted upon the saw mandrel and is connected by a bar, $n$, with an eccentric pin, $i$, secured to the face of a hub, G, mounted upon a rotating shaft H. This rotating shaft is supported by standards, J J, above the bed plate of the engine, the upper ends of the standards being formed into boxes in which the shaft (H) turns; and as the pin $i$ is eccentric to the axis of the shaft, the rotation of the latter imparts a reciprocating movement to the pawl-bar $n$, and alternately draws the pawl toward the rotating shaft and pushes it from the same. The under side of the pawl is curved, so that it draws freely out of the notch of the wheel with which it may be engaged when it is drawn toward the rotating shaft.

The tool, by means of which the saw teeth are cut, is a species of chisel. It is secured to a tool holder, K, which forms the front end of a lever, L, that is pivoted to a standard M, upon the bed plate. The tail, $g$, of the lever projects toward the rotating shaft H, and is in a proper position to be acted upon by a cam N, that is secured to that shaft. The raising of the tool is effected by the rotation of the cam N, and its quick descent, to cause its edge to strike the saw plate with a blow, is effected by means of a spring, P, acting near the tool holder. In order to control the extent of the cut made by the tool, a bumper, *r*, is secured to the front end of the tool lever, and an adjustable stop, S, is secured to the bed plate of the engine in a position to be struck by the bumper when the tool has descended to the proper limit. The adjustment of the stop is effected by screwing its lower extremity into or out of a socket in the bed plate.

As the saws for grooving needles are generally only an inch in diameter, and as a representation of a cutting tool of the proper size for such a saw would be too small to show the form distinctly, the form of the end of the cutting tool is shown at Figs. 4, 5 and 6 upon an enlarged scale. The face of the tool is grooved with a V formed groove, as shown at *s* Figs. 5 and 6, and in dotted lines in Fig. 4, so that as the tool strikes the saw plate it cuts the edge thereof into a V form at the same time that it cuts the profile of the tooth. The blow of the tool raises a fin or bur upon the saw blank, as shown at Fig. 4, and as, from the construction of the mechanism for turning the saw blank, the latter is caused to turn in the direction of the arrow, *t*, between the rise and descent of the tool *l*, the blow of the latter cuts away the bur made at the preceding cut and leaves the saw tooth of the proper finished form.

The angle at which the tool strikes the saw blank is controlled by the form of the tool holding lever, by the shape of the tool, and by the distance to which the tool holder is permitted to descend by the stop S. When the tool is forged and ground to the required form, it is placed in the tool holder and is adjusted to strike at the proper angle by varying its set in the tool holder, and by adjusting the position of the stop. The change in the angle at which the tool strikes, changes the profile of the saw; and the change in the form of the groove in the tool changes the section of the rim of the saw; so that by varying these, any desired form within certain limits may be given to the saw teeth cut by this cutting engine.

The machine may be operated by power by applying a belt to the rim of the hub, G, of the rotating shaft, or it may be operated by hand by means of a crank handle, R, secured to the cam N. The tools are made of tempered steel, and the saw plates of annealed steel first punched out of a sheet and then turned to the precise diameter. As the rotating shaft is turned, the cam N raises the cutting tool, and at the same time the eccentric pin *i* draws back the pawl and enters it into a new notch of the notched wheel D. As the cam makes a complete revolution before releasing the tail of the tool lever, the pawl is not only drawn back but is again pushed forward, to turn the notched wheel and the saw mandrel and saw plate the space of a notch, before the tool descends to cut the saw tooth. The cam is so timed with reference to the eccentric pin that operates the pawl, that the blow of the tool takes effect when the eccentric pin is at one of its dead points, so that the saw blank is held rigidly in position by the pawl against the blow of the cutting tool.

The cutting engine thus described embodies all parts of my invention, which however is not limited to the peculiar construction of the parts in which it is embodied.

What I claim as my invention and desire to secure by Letters Patent is—

1. The combination of the following members constituting a saw cutting engine; viz., a mandrel to hold the saw plate, mechanism to turn the same intermittently to space the teeth, a chisel to cut the teeth, and mechanism to operate and control the chisel; the combination as a whole being and operating substantially as set forth.

2. The combination of the above enumerated members in such manner that the cutting of one tooth of a saw removes the bur formed by cutting a preceding tooth, substantially as described.

3. Combining a chisel having a groove in its face with mechanism that holds the same and causes it to strike the saw blank at the required angle, substantially as herein set forth.

In testimony whereof I have hereunto subscribed my name.

CHARLES KAISER.

Witnesses:
R. W. McCLELLAN,
W. L. BENNERN.